(12) United States Patent
Abe

(10) Patent No.: US 6,226,132 B1
(45) Date of Patent: May 1, 2001

(54) ACHROMATIC LENS SYSTEM

(75) Inventor: Tetsuya Abe, Hokkaido (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/398,142

(22) Filed: Sep. 17, 1999

(30) Foreign Application Priority Data

Sep. 18, 1998 (JP) .................................. 10-265305

(51) Int. Cl.$^7$ ........................................ G02B 9/00
(52) U.S. Cl. ............................. 359/797; 359/784
(58) Field of Search ........................ 359/718, 797, 359/784

(56) References Cited

U.S. PATENT DOCUMENTS

| | | | |
|---|---|---|---|
| 3,572,902 | * 3/1971 | Uetake | 359/658 |
| 4,190,324 | * 2/1980 | Arai | 359/790 |
| 4,761,064 | * 8/1988 | Mercado et al. | 359/797 |
| 5,568,325 | * 10/1996 | Hirano et al. | 359/788 |
| 5,587,841 | 12/1996 | Ito | 359/689 |

* cited by examiner

Primary Examiner—Georgia Epps
Assistant Examiner—Evelyn A. Lester
(74) Attorney, Agent, or Firm—Greenblum & Bernstein, P.L.C.

(57) ABSTRACT

An achromatic lens system includes a negative single lens element, a positive single lens element, and a negative single lens element, in this order from the object, and satisfies the following condition:

$$|\theta_{pt}-\theta_{nt}|<0.02 \qquad (1)$$

wherein $\theta_{pt}$ designates the partial dispersion ratio at the t-line, defined by $(n_C-n_t)/(n_F-n_C)$ with respect to the positive single lens element;

$\theta_{nt}$ designates the average of the partial dispersion ratios at the t-line, defined by $(n_C-n_t)/(n_F-n_C)$ with respect to the negative single lens elements;

$n_C$ designates the refractive index at the C-line;

$n_t$ designates the refractive index at the t-line; and $n_F$ designates the refractive index at the F-line.

5 Claims, 15 Drawing Sheets

SPHERICAL ABERRATION

THE SINE CONDITION

SPHERICAL ABERRATION

CHROMATIC ABERRATION

SPHERICAL ABERRATION

THE SINE CONDITION

SPHERICAL ABERRATION

CHROMATIC ABERRATION

ACHROMATIC LENS SYSTEM

BACKGROUND OF THE INVENTION

1. Field of the Invention

The present invention relates to an achromatic lens system which is used in objective lens elements of an astronomical telescope, in collimator lens elements, and the like.

2. Description of the Related Art

An achromatic lens system in which a positive lens element is provided between two negative lens elements has been well known. Further, in order to decrease the secondary spectrum of axial chromatic aberration, an achromatic lens system which employs a positive lens element made of fluorite has been widely used. However, fluorite is known as a material which is difficult to be machined, and is expensive. Furthermore, recent CCD cameras have sensitivity in the near-infrared range, while achromatic lens systems which use fluorite cause the over-correcting in the near-infrared range. As a result, suitable chromatic correction in the visible range and the near-infrared range cannot be simultaneously performed.

For example, in the prior art, when astronomical photography is performed with a CCD camera, an infrared-cut filter has to be used in order to cut light in the near-infrared range because chromatic correction by an objective lens system (achromatic lens system) of the CCD camera is insufficient in the near-infrared range though the CCD camera has sensitivity in the near-infrared range. If sensitivity of CCD cameras in the near-infrared range is utilized, clear celestial images can be photographed through image processing technologies. The same can be applied to surveillance cameras which utilize near-infrared light.

SUMMARY OF THE INVENTION

It is an object of the present invention to provide an achromatic lens system in which no fluorite is used, in particular, to provide a three-lens-element achromatic lens system which is constituted by a negative lens element, a positive lens element and a negative lens element, and can suitably correct chromatic aberration in the near-infrared range. Furthermore, it is another object of the present invention to provide an achromatic lens system which can perform chromatic correction in both the near-infrared range and the visible range in a well-balanced manner.

In order to attain the above mentioned objects, there is provided an achromatic lens system which is constituted by a negative single lens element, a positive single lens element, and a negative single lens element, in this order from the object, and satisfies the following condition:

$$|\theta_{pt} - \theta_{nt}| < 0.02 \tag{1}$$

wherein $\theta_{pt}$ designates the partial dispersion ratio at the t-line, defined by $(n_C - n_t)/(n_F - n_C)$ with respect to the positive single lens element;

$\theta_{nt}$ designates the average of the partial dispersion ratios at the t-line, defined by $(n_C - n_t)/(n_F - n_C)$ with respect to the negative single lens elements;

$n_C$ designates the refractive index at the C-line;

$n_t$ designates the refractive index at the t-line; and $n_F$ designates the refractive index at the F-line.

Furthermore, it is preferable that the achromatic lens system satisfy the following condition:

$$|\theta_{pg} - \theta_{ng}| < 0.02 \tag{2}$$

wherein $\theta_{pg}$ designates the partial dispersion ratio at the g-line, defined by $(n_g - n_F)/(n_F - n_C)$ with respect to the positive single lens element;

$\theta_{ng}$ designates the average of the partial dispersion ratios at the g-line, defined by $(n_g - n_F)/(n_F - n_C)$ with respect to the negative single lens elements; and $n_g$ designates the refractive index at the g-line.

Preferably, the positive single lens element is not made of fluorite, but of an optical glass material. In addition, from another aspect, it is preferable that the positive single lens element be made of a glass material which satisfies the following condition:

$$\nu_P > 80.0 \tag{3}$$

wherein $\nu_P$ designates the Abbe number of the positive single lens element.

More preferably, the positive single lens element is made of a glass material which satisfies the following condition:

$$\nu_P > 91.0 \tag{4}$$

The present disclosure relates to subject matter contained in Japanese Patent Application No.10-265305 (filed on Sep. 18, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
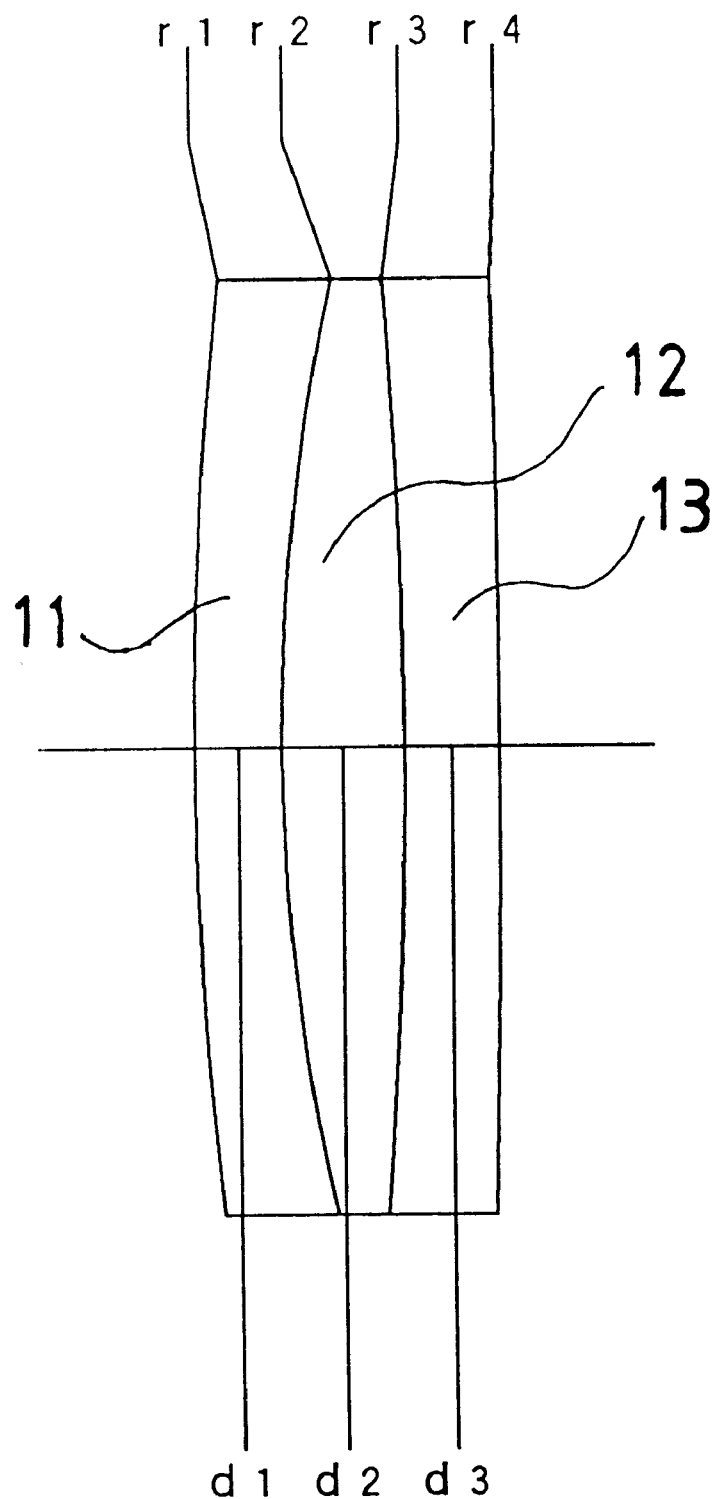
FIG. 1 is a lens arrangement of the first embodiment of an achromatic lens system according to the present invention.

In comparison with an achromatic lens system having one negative lens element and one positive lens element, a three-lens-element achromatic lens system in which a positive lens element is provided between two negative lens elements can suppress spherical aberration of a higher order because the power of the negative lens elements is distributed over the two lens elements. Furthermore, if fluorite is utilized for the positive lens element, a large aperture achromatic lens system can be obtained, through which the secondary spectrum of axial chromatic aberration in the visible range can be suppressed. However, fluorite shows extremely low refractive index in the vicinity of the t-line (near-infrared range), which results in showing abnormal dispersive power. Therefore a three-lens-element achromatic lens system utilizing fluorite cannot reduce the difference of partial dispersion ratios between the positive lens element and the negative lens elements to a predetermined value (or less) at the same time in both the near-infrared range and the visible range. In other words, a conventional achromatic lens system, which utilizes fluorite, and is designed to suppress the secondary spectrum of axial chromatic aberration in the visible range (the g-line), cannot solve a problem on the over-correcting of axial chromatic aberration in the near-infrared range.

According to the embodiments, a three-lens-element achromatic lens system having a negative lens element, a positive lens element, and a negative lens element, can perform the correcting of axial chromatic aberration in the visible range and the near-infrared range in a well-balanced manner without utilizing an expensive material such as fluorite. More concretely, the positive lens element is made of a low dispersion optical glass material whose abnormal dispersive power in the near-infrared range is not so strong as that of fluorite, and the negative lens elements are made of predetermined optical glass. Through the combination of the above three lens elements, the secondary spectrum of axial chromatic aberration is successfully reduced in a wide wavelength range including the visible range and the near-infrared range.

Condition (1) specifies the partial dispersion ratios of the positive lens element and the negative lens element at the t-line. By reducing the difference of the partial dispersion ratios of one positive lens element and two negative lens elements so that condition (1) is satisfied, the secondary spectrum of axial chromatic aberration in the near-infrared range in the vicinity of the t-line can be suppressed to a smaller value. If $|\theta_{pt}-\theta_{nt}|$ exceeds the upper limit of condition (1), the difference of the partial dispersion ratios of one positive single lens element and two negative single lens elements at the t-line becomes too large, so that the secondary spectrum of axial chromatic aberration in the vicinity of the t-line cannot be reduced.

Condition (2) specifies the partial dispersion ratios of the positive lens element and the negative lens element at the g-line. By reducing the difference of the partial dispersion ratios of one positive lens element and two negative lens elements so that condition (2) is satisfied, the secondary spectrum of axial chromatic aberration in the visible range in the vicinity of the g-line can be suppressed to a smaller value. If $|\theta_{pg}-\theta_{ng}|$ exceeds the upper limit of condition (2), the difference of the partial dispersion ratios of one positive single lens element and two negative single lens elements at the g-line becomes too large, so that the secondary spectrum of axial chromatic aberration in the vicinity of the g-line cannot be reduced.

Condition (3) relates to a low dispersion optical glass material to be used for the positive lens element. By selecting a low dispersion glass material having the Abbe number which satisfies condition (3), suitable optical performance can be achieved. If $\nu_P$ exceeds the lower limit of condition (3), the difference of the Abbe numbers for the negative lens elements and the positive lens element becomes too small, if conditions (1) and (2) are to be satisfied. As a result, spherical aberration of a higher order excessively occurs, so that suitable optical performance cannot be obtained.

Condition (4) specifies a more preferable condition on a low dispersion optical glass material to be used for the positive lens element. If the Abbe number of a low dispersion optical glass material constituting the positive lens element satisfies condition (4), more improved optical performance can be obtained. If $\nu_P$ exceeds the lower limit of condition (4), the difference of the Abbe numbers for the negative lens elements and the positive lens element cannot be made sufficiently larger, if conditions (1) and (2) are to be satisfied. As a result, spherical aberration of a higher order occurs, so that a lens system with a larger aperture cannot be obtained.

The following is a description of the numerical data of the embodiments. In the tables and drawings below, $F_{NO}$ designates the F-number, f designates the focal length, $f_B$ designates the back focal distance, r designates the radius of curvature of each lens surface, d designates the lens thickness or the distance between the lens elements, $n_d$ designates the refractive index at the d-line, and $\nu$ designates the Abbe number. In the aberration diagrams, the d, g and C lines respectively designate chromatic aberration represented by spherical aberration, SA designates spherical aberration and SC designates the sine condition. Moreover, in the diagrams of axial chromatic aberration, the axis of the abscissa indicates the wavelength ($\mu$m), and the axis of the ordinate indicates the value of 1000×CA/f, in which the amount of axial chromatic aberration CA (mm) is normalized by the focal length f(mm).

[Embodiment 1]

Figure 2A:
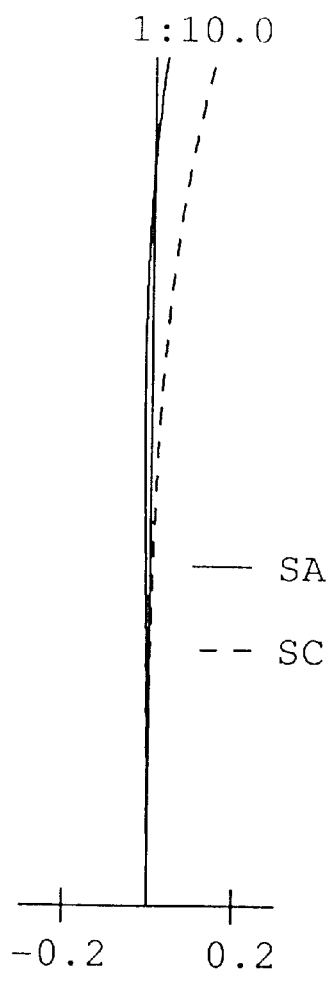
FIGS. 2A and 2B show longitudinal aberrations of the lens system of FIG. 1.
Figure 2B:
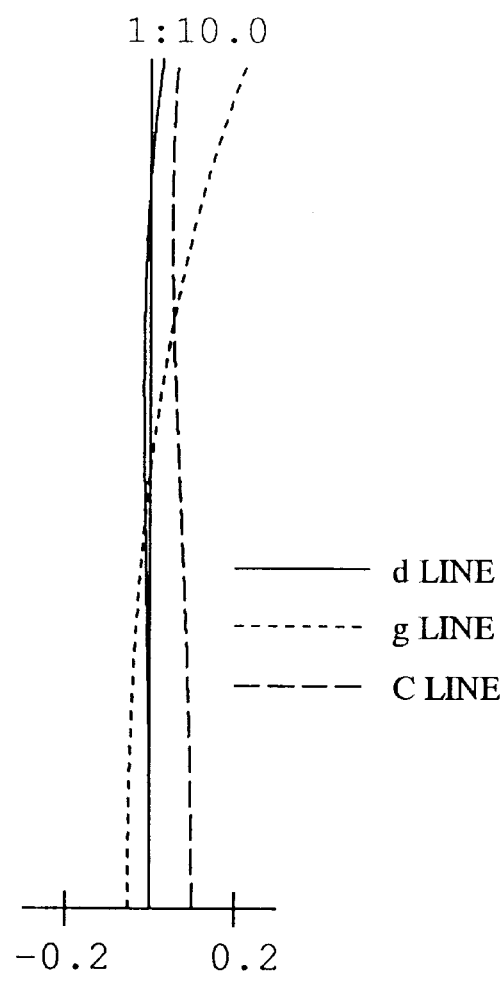
Figure 3:
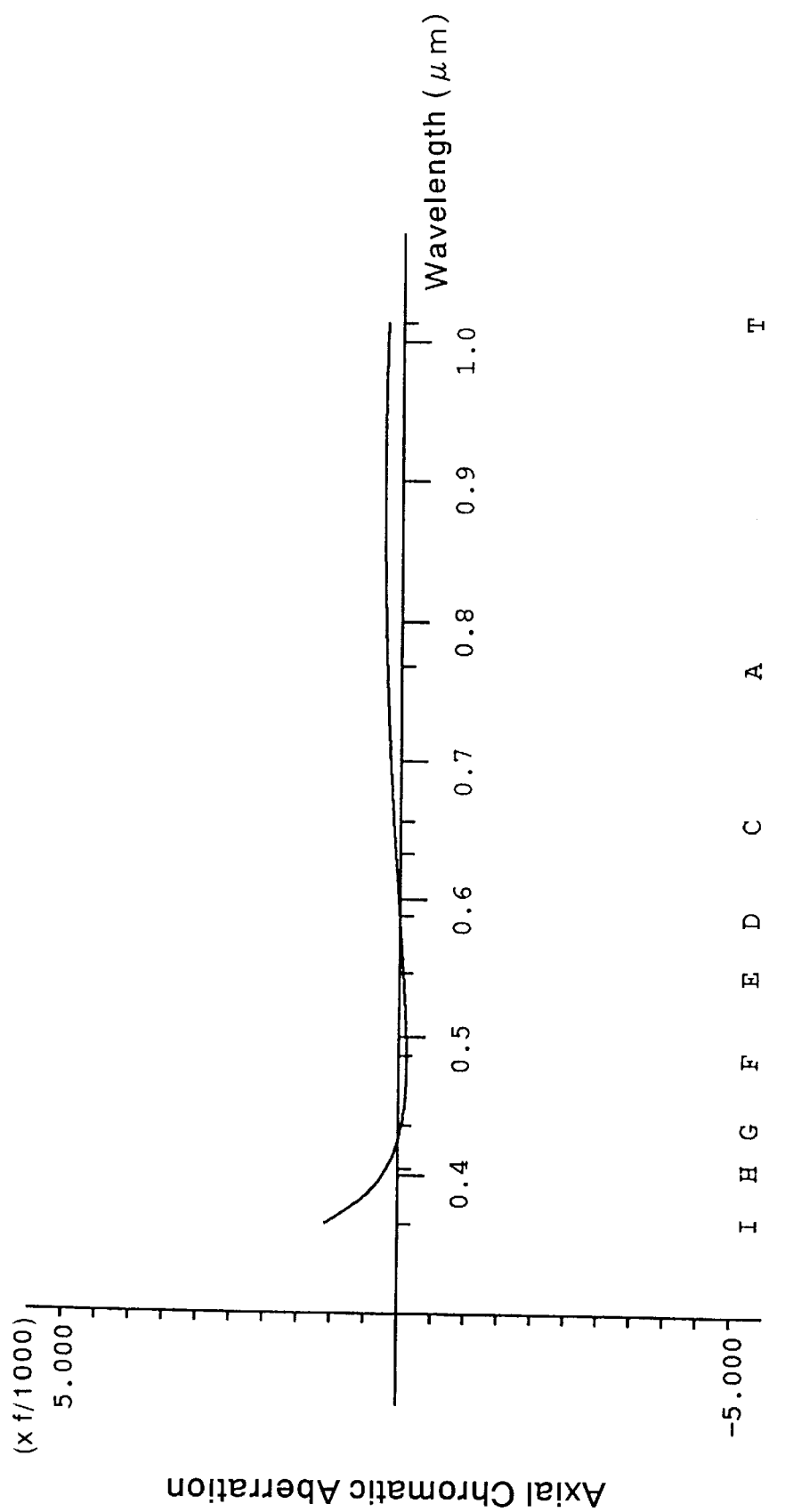
FIG. 3 shows axial chromatic aberration of the lens system of FIG. 1.

FIG. 1 is a lens arrangement of the first embodiment of an achromatic lens system, Table 1 shows the numerical data thereof. FIGS. 2A and 2B show longitudinal aberrations of the lens system of FIG. 1, and FIG. 3 shows axial chromatic aberration of the lens system of FIG. 1. The achromatic lens system is constituted by the first lens element 11 which is a negative meniscus single lens element having a convex surface on the side of the object, the second lens element 12 which is a biconvex single lens element, and the third lens element 13 which is a negative meniscus single lens element having a convex surface on the side of the image, in this order from the object. All of the three lens elements are cemented.

TABLE 1

$F_{NO}$ = 1:10.0
f = 1001.68
$f_B$ = 981.22

| Surface No. | r | d | $n_d$ | $\nu$ |
|---|---|---|---|---|
| 1 | 425.000 | 9.35 | 1.51633 | 64.1 |
| 2 | 221.000 | 13.18 | 1.43875 | 95.0 |

TABLE 1-continued $F_{NO} = 1:10.0$
$f = 1001.68$
$f_B = 981.22$

| Surface No. | r | d | $n_d$ | ν |
|---|---|---|---|---|
| 3 | −627.298 | 10.20 | 1.51742 | 52.4 |
| 4 | −1985.225 | — | — | — |

[Embodiment 2]

Figure 4:
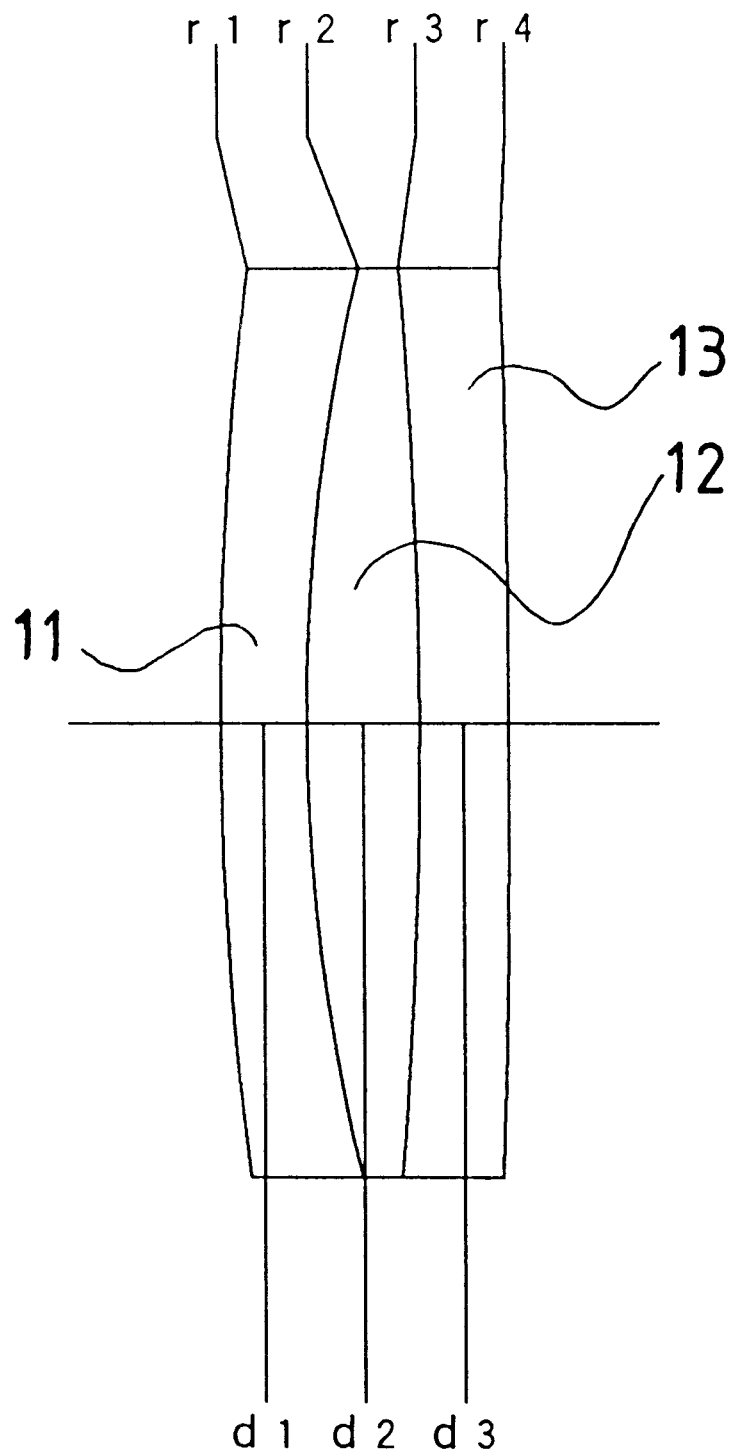
FIG. 4 is a lens arrangement of the second embodiment of an achromatic lens system according to the present invention.
Figure 5A:
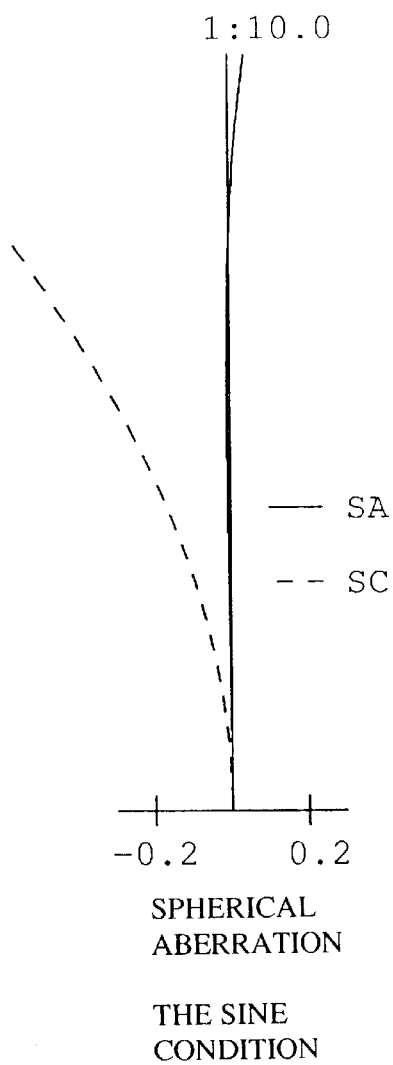
FIGS. 5A and 5B show longitudinal aberrations of the lens system of FIG. 4.
Figure 5B:
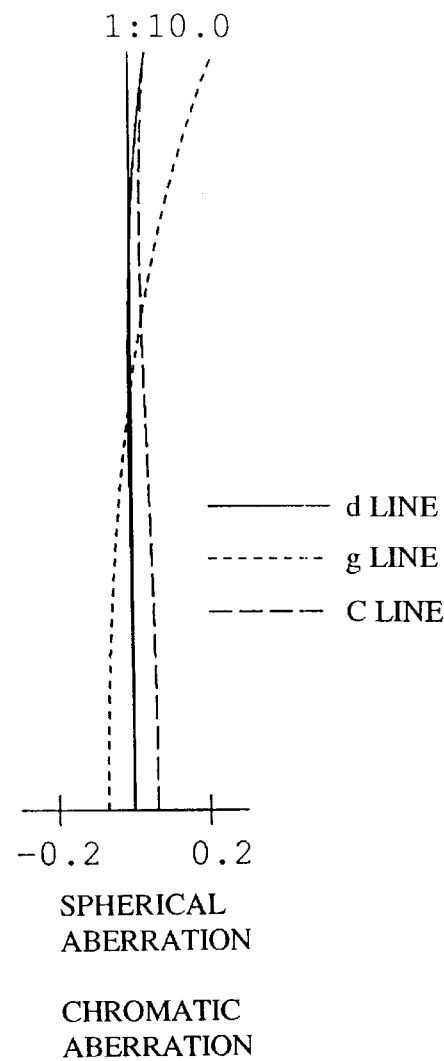
Figure 6:
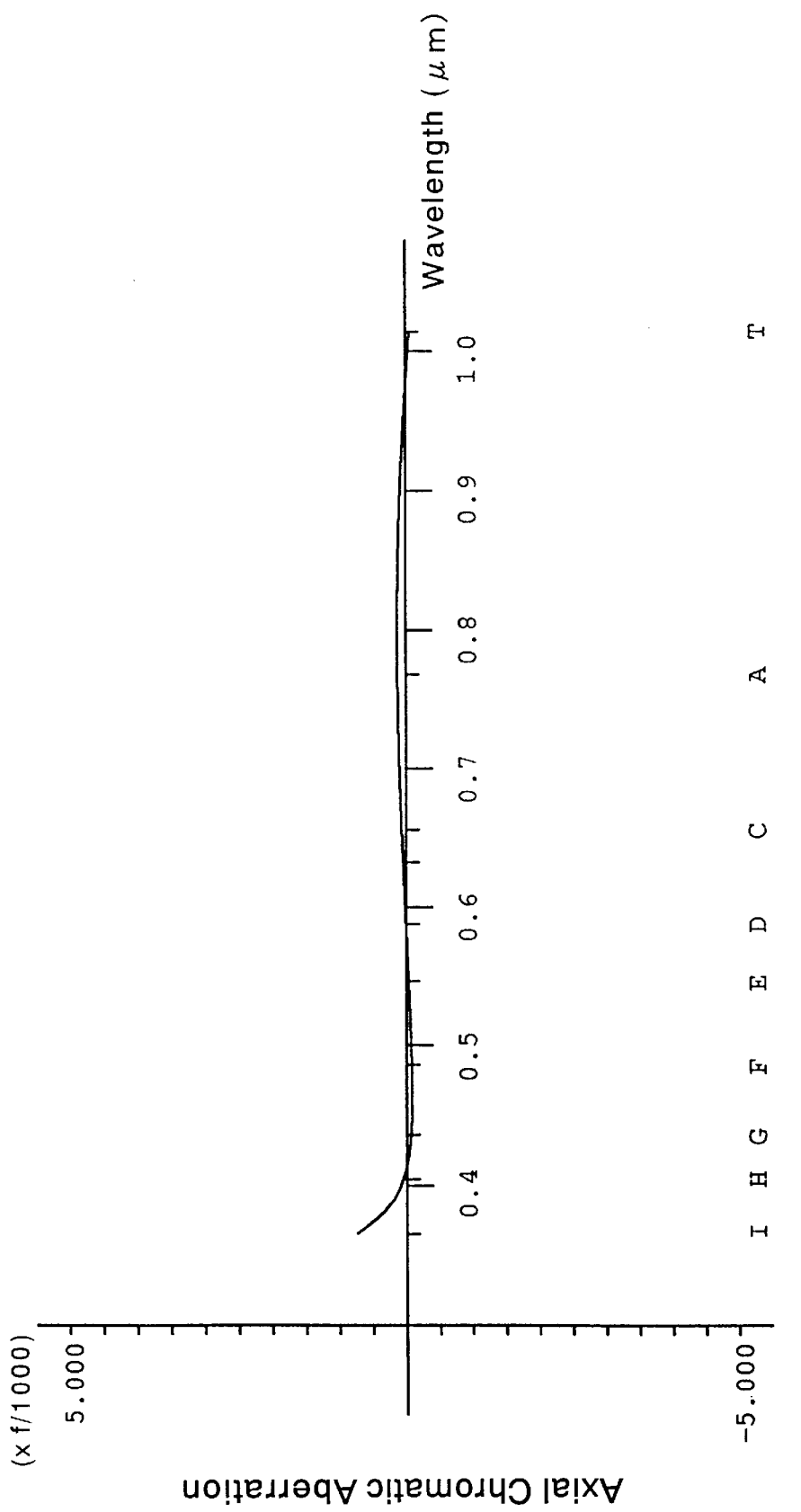
FIG. 6 shows axial chromatic aberration of the lens system of FIG. 4.

FIG. 4 is a lens arrangement of the second embodiment of an achromatic lens system, and Table 2 shows the numerical data thereof. FIGS. 5A and 5B show longitudinal aberrations of the lens system of FIG. 4. FIG. 6 shows axial chromatic aberration of the lens system of FIG. 4. The lens arrangement of the achromatic lens system in this embodiment is the same as that of the first embodiment.

TABLE 2

$F_{NO} = 1:10.0$
$f = 1000.09$
$f_B = 979.82$

| Surface No. | r | d | $n_d$ | ν |
|---|---|---|---|---|
| 1 | 385.528 | 9.50 | 1.48749 | 70.2 |
| 2 | 210.646 | 12.50 | 1.43875 | 95.0 |
| 3 | −605.256 | 10.00 | 1.73400 | 51.5 |
| 4 | −1618.062 | — | — | — |

[Embodiment 3]

Figure 7:
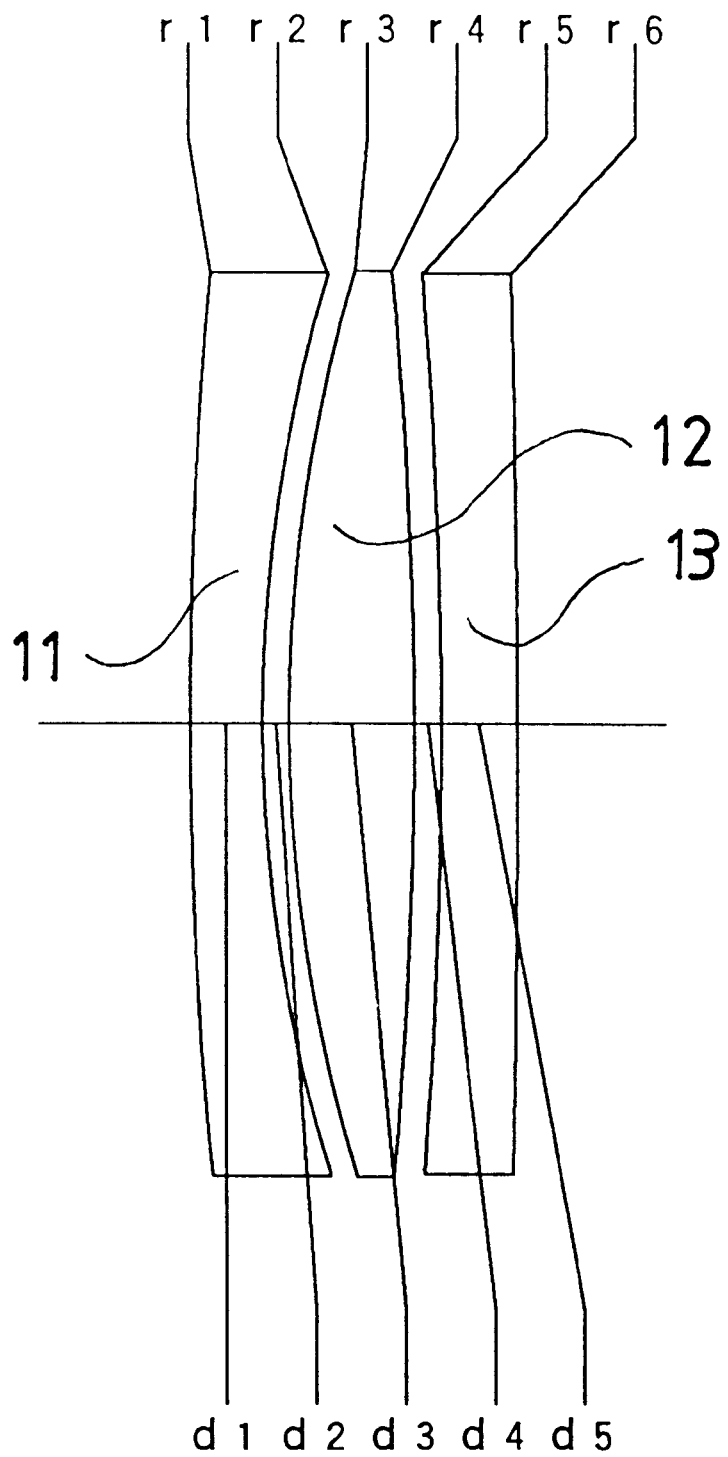
FIG. 7 is a lens arrangement of the third embodiment of an achromatic lens system according to the present invention.
Figure 8A:
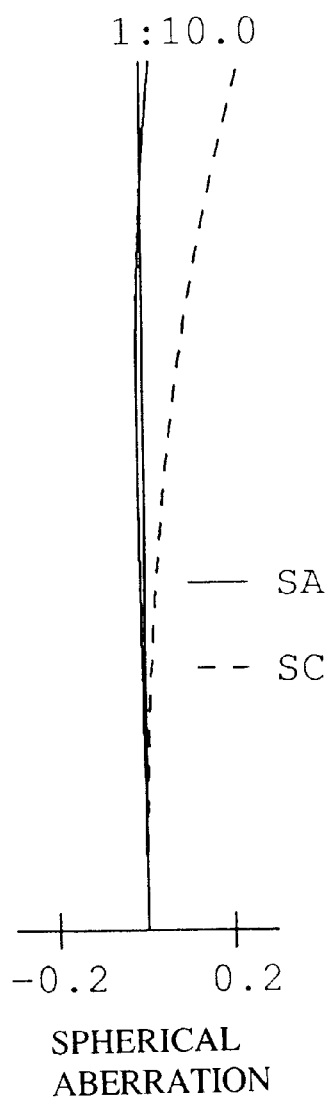
FIGS. 8A and 8B show longitudinal aberrations of the lens system of FIG. 7.
Figure 8B:
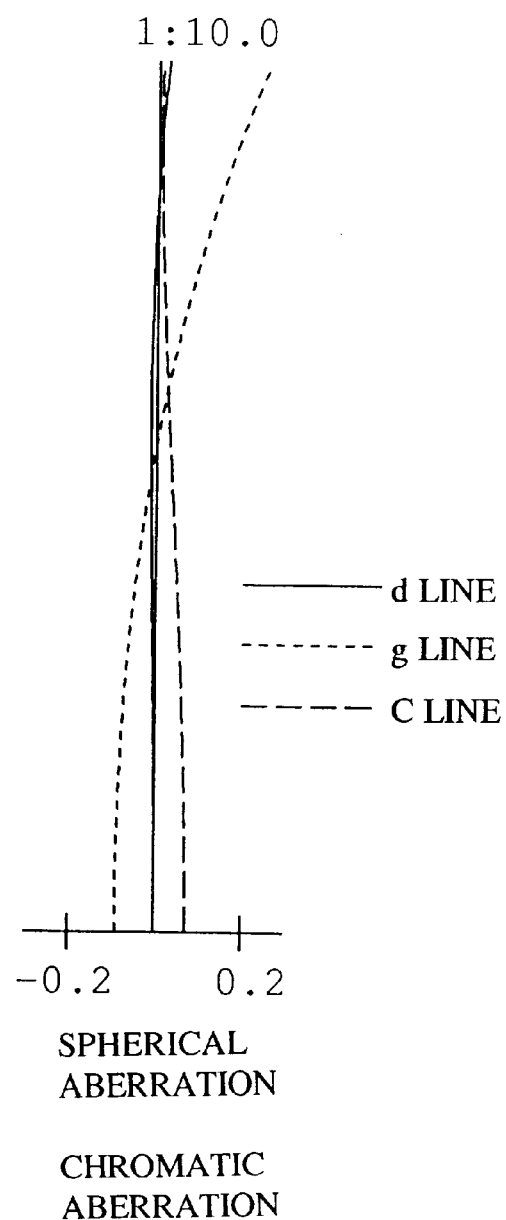
Figure 9:
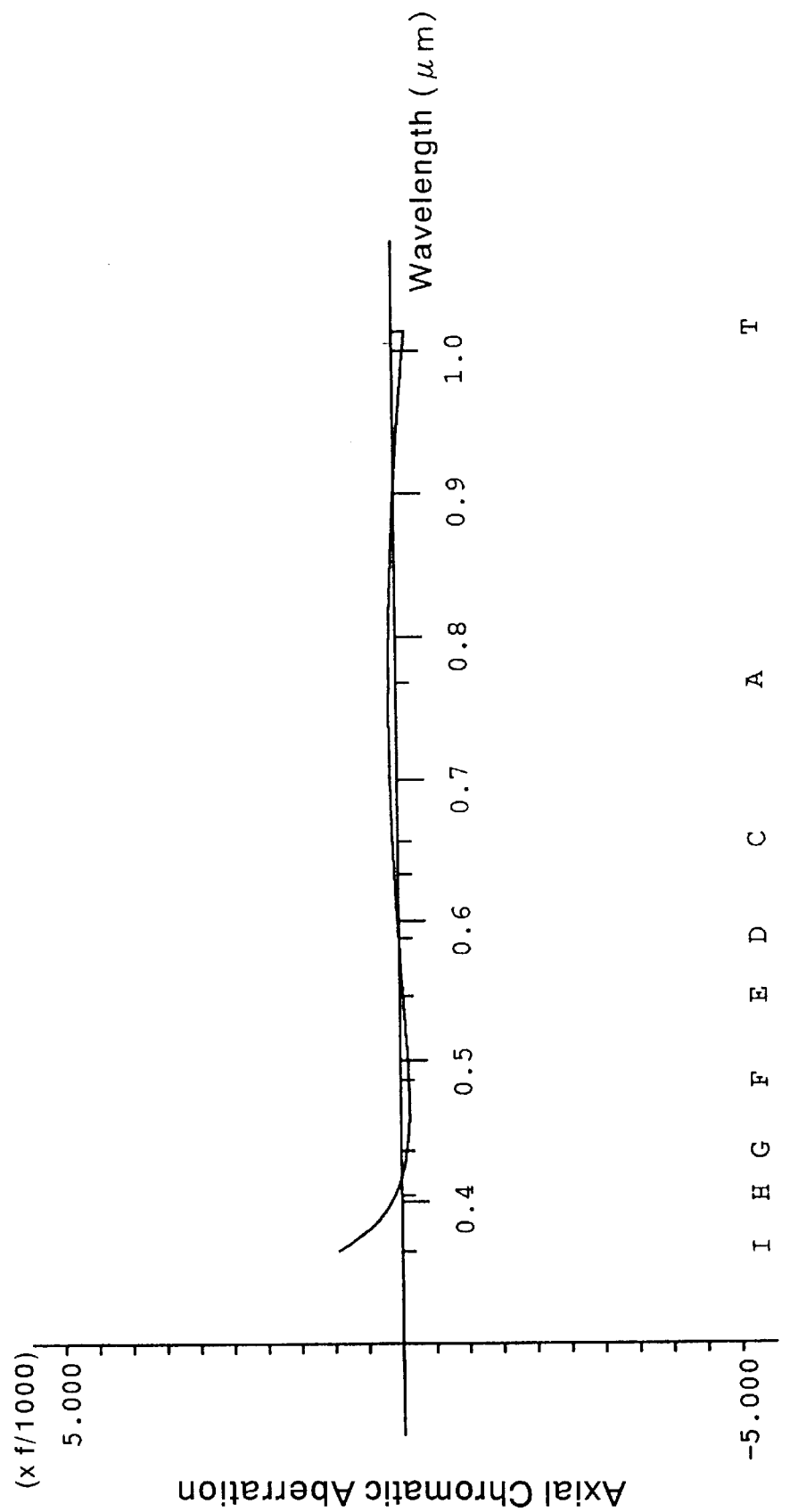
FIG. 9 shows axial chromatic aberration of the lens system of FIG. 7.

FIG. 7 is a lens arrangement of the third embodiment of an achromatic lens system, and Table 3 shows the numerical data thereof. FIGS. 8A and 8B show longitudinal aberrations of the lens system of FIG. 7. FIG. 9 shows axial chromatic aberration of the lens system of FIG. 7. The achromatic lens system of this embodiment is the same as those of the first and second embodiments. In other words, the achromatic lens system is constituted by the first lens element 11 which is a negative meniscus single lens element having a convex surface on the side of the object, the second lens element 12 which is a biconvex single lens element, and the third lens element 13 which is a negative meniscus single lens element having a convex surface on the side of the image, in this order from the object; however, these three lens elements are not cemented, which is different from the first and second embodiments.

TABLE 3

$F_{NO} = 1:10.0$
$f = 1000.02$
$f_B = 983.44$

| Surface No. | r | d | $n_d$ | ν |
|---|---|---|---|---|
| 1 | 505.760 | 8.00 | 1.51874 | 64.5 |
| 2 | 167.590 | 3.00 | — | — |
| 3 | 169.910 | 14.00 | 1.49700 | 81.6 |
| 4 | −553.832 | 3.00 | — | — |
| 5 | −642.543 | 8.50 | 1.65844 | 50.9 |
| 6 | −2625.925 | — | — | — |

[Embodiment 4]

Figure 10:
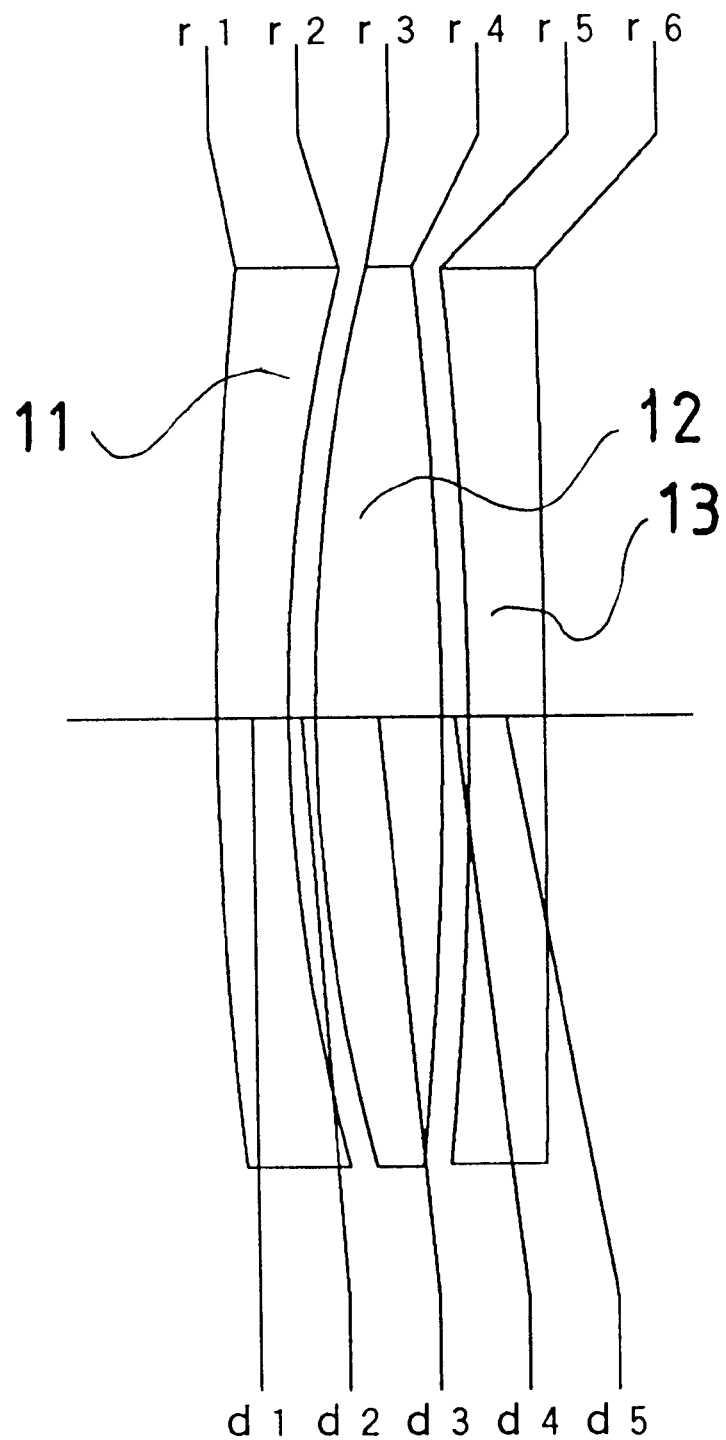
FIG. 10 is a lens arrangement of the fourth embodiment of an achromatic lens system according to the present invention.
Figure 11A:
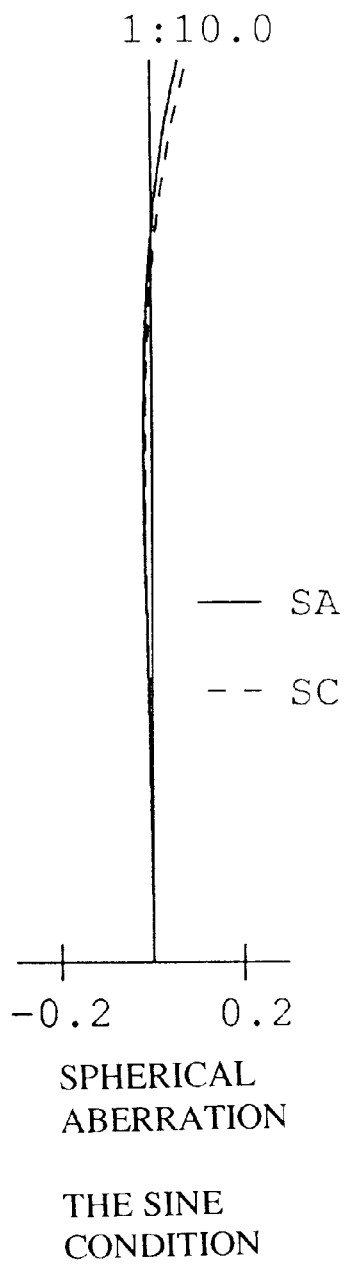
FIGS. 11A and 11B show longitudinal aberrations of the lens system of FIG. 10.
Figure 11B:
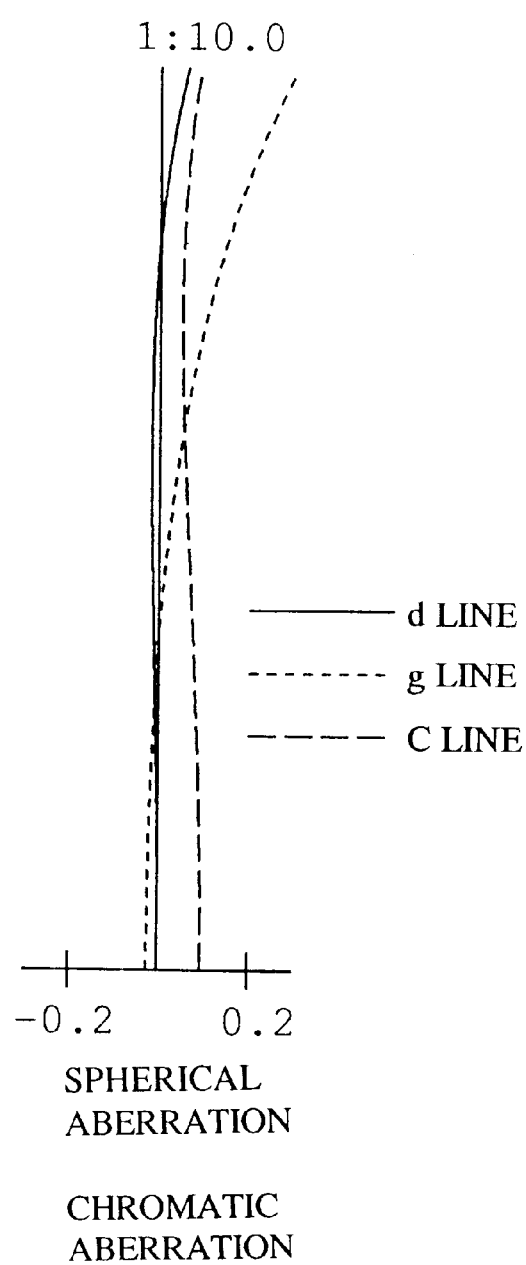
Figure 12:
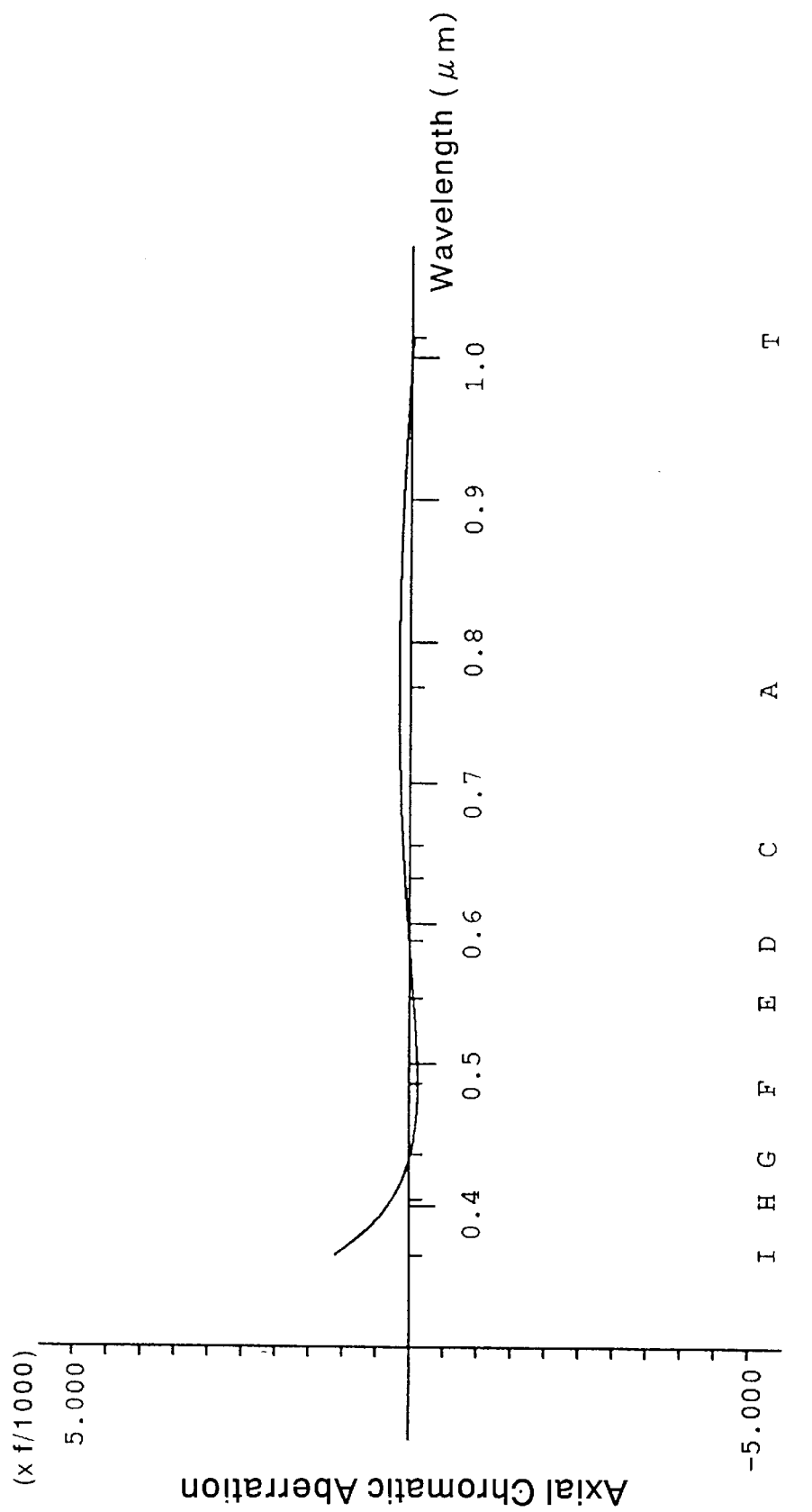
FIG. 12 shows axial chromatic aberration of the lens system of FIG. 10.

FIG. 10 is a lens arrangement of the fourth embodiment of an achromatic lens system according to the present invention, and Table 4 shows the numerical data thereof. FIGS. 11A and 11B show longitudinal aberrations of the lens system of FIG. 10. FIG. 12 shows axial chromatic aberration of the lens system of FIG. 10. The lens arrangement of the achromatic lens system in this embodiment is the same as that of the third embodiment.

TABLE 4

$F_{NO} = 1:10.0$
$f = 1000.02$
$f_B = 979.22$

| Surface No. | r | d | $n_d$ | ν |
|---|---|---|---|---|
| 1 | 445.888 | 8.00 | 1.48749 | 70.2 |
| 2 | 199.386 | 3.00 | — | — |
| 3 | 202.781 | 14.00 | 1.45600 | 90.3 |
| 4 | −478.062 | 3.00 | — | — |
| 5 | −499.834 | 8.50 | 1.51742 | 52.4 |
| 6 | −3025.729 | — | — | — |

[Embodiment 5]

Figure 13:
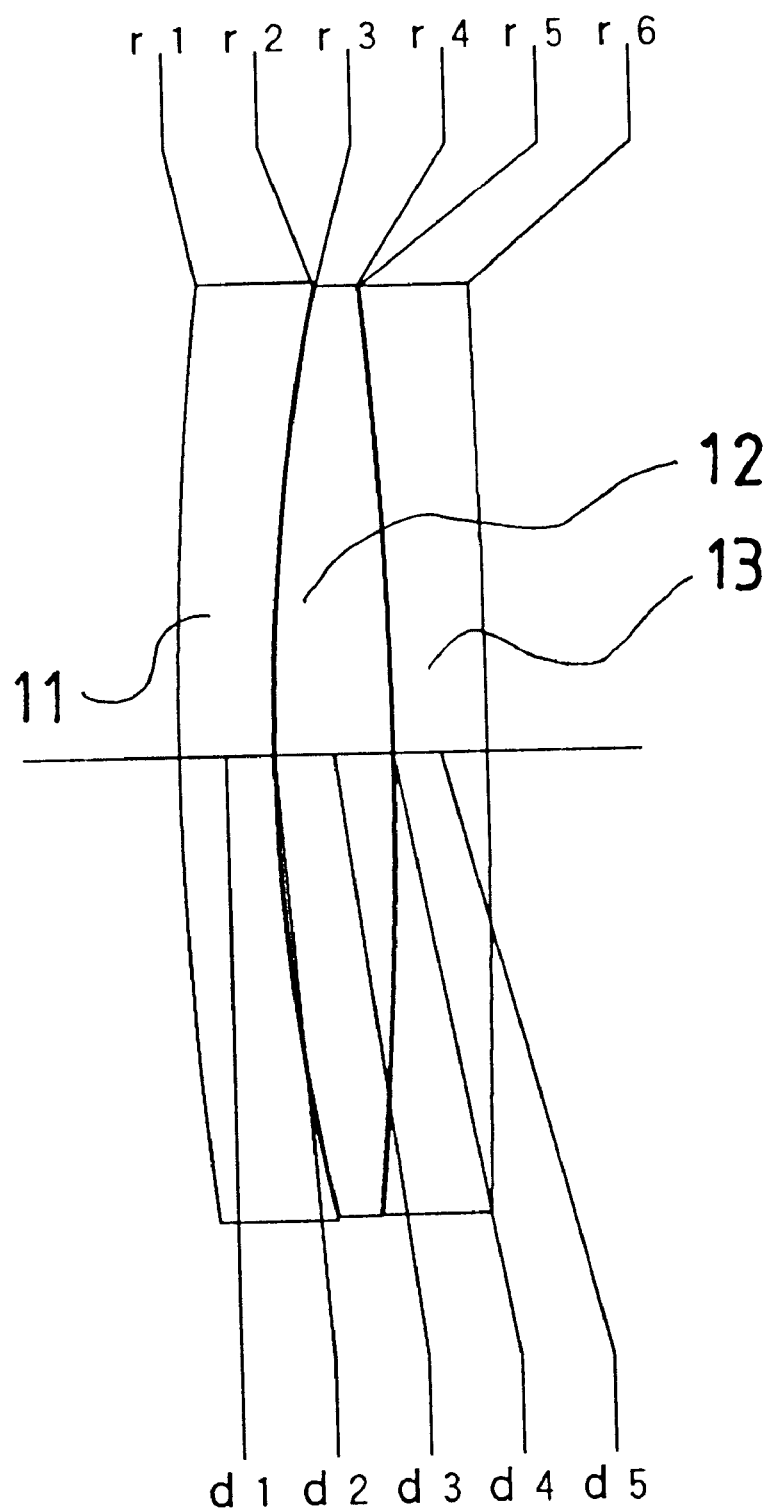
FIG. 13 is a lens arrangement of the fifth embodiment of an achromatic lens system according to the present invention.
Figure 14A:
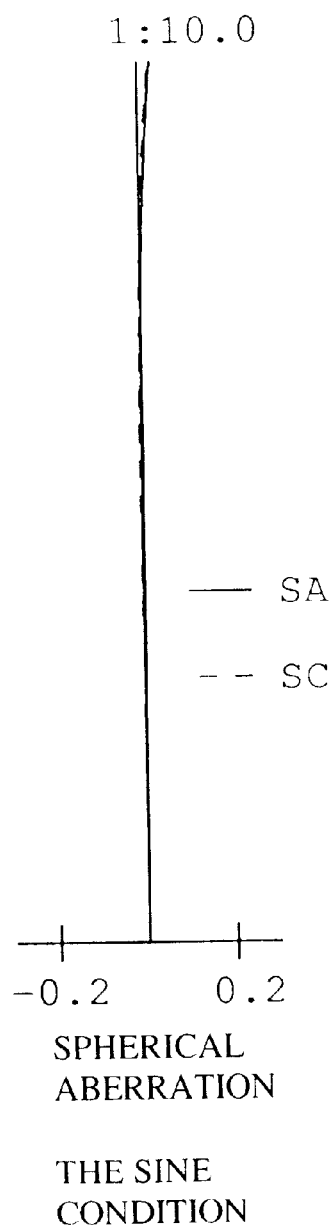
FIGS. 14A and 14B show longitudinal aberrations of the lens system of FIG. 13.
Figure 14B:
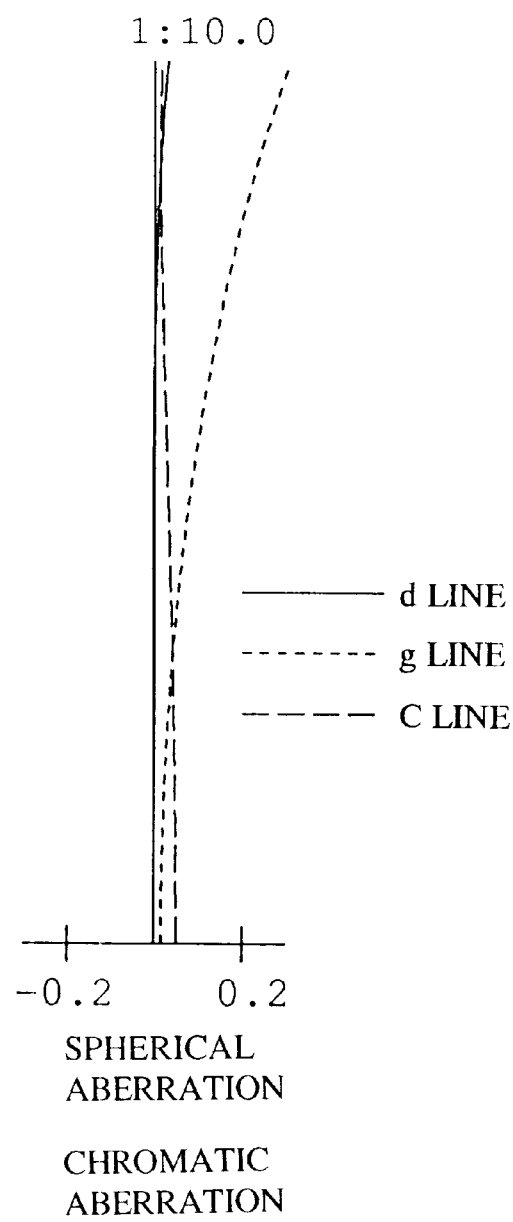
Figure 15:
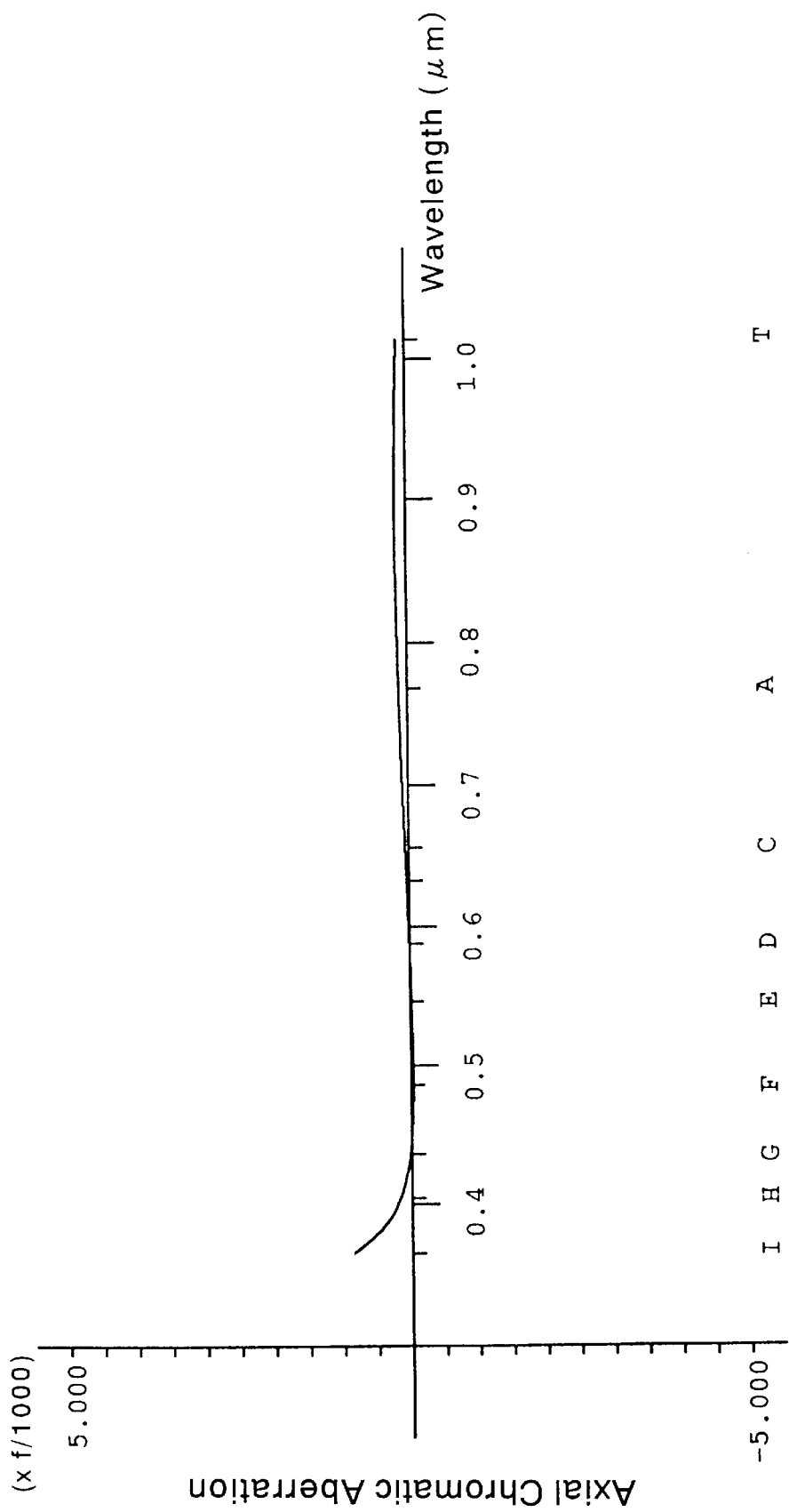
FIG. 15 shows axial chromatic aberration of the lens system of FIG. 13.

FIG. 13 is a lens arrangement of the fifth embodiment of an achromatic lens system, and Table 5 shows the numerical data thereof. FIGS. 14A and 14B show longitudinal aberrations of the lens system of FIG. 13. FIG. 15 shows axial chromatic aberration of the lens system of FIG. 13. The lens arrangement of the achromatic lens system in this embodiment is the same as that of the third embodiment.

TABLE 5

$F_{NO} = 1:10.0$
$f = 999.98$
$f_B = 978.96$

| Surface No. | r | d | $n_d$ | ν |
|---|---|---|---|---|
| 1 | 400.596 | 10.00 | 1.55963 | 61.2 |
| 2 | 224.053 | 0.20 | — | — |
| 3 | 222.068 | 12.50 | 1.43875 | 95.0 |
| 4 | −504.989 | 0.20 | — | — |
| 5 | −515.920 | 10.00 | 1.55963 | 61.2 |
| 6 | −1650.708 | — | — | — |

Table 6 shows a value of each condition in each embodiment. It is apparent from Table 6 that the first through fifth embodiments satisfy the conditions (1) through (3), and the embodiments other than the third and fourth embodiments also satisfy condition (4).

TABLE 6

| | Embod.1 | Embod.2 | Embod.3 | Embod.4 | Embod.5 |
|---|---|---|---|---|---|
| θt1 | 0.868 | 0.890 | 0.868 | 0.890 | 0.840 |
| θt2 | 0.840 | 0.840 | 0.830 | 0.840 | 0.840 |
| θt3 | 0.800 | 0.806 | 0.779 | 0.800 | 0.840 |
| θg1 | 0.535 | 0.530 | 0.534 | 0.530 | 0.539 |
| θg2 | 0.536 | 0.536 | 0.538 | 0.534 | 0.536 |
| θg3 | 0.555 | 0.548 | 0.555 | 0.555 | 0.539 |
| |θpt−θnt| | 0.006 | 0.008 | 0.007 | 0.005 | 0.000 |
| |θpg−θng| | 0.009 | 0.003 | 0.007 | 0.009 | 0.003 |
| νp | 95.0 | 95.0 | 81.6 | 90.3 | 95.0 |

According to the above description, an achromatic lens system in which the secondary spectrum of axial chromatic aberrations in the near-infrared range is adequately corrected can be obtained. Furthermore, an achromatic lens system in which axial chromatic aberration can be corrected in a well balanced manner over a wide wavelength range from the visible range to the near-infrared range can be obtained.

What is claimed is:

1. An achromatic lens system comprising a negative single lens element, a positive single lens element, and a negative single lens element, in this order from an object; and said achromatic lens system satisfies the following condition:

$|\theta_{pt}-\theta_{nt}|<0.02$ wherein:

$\theta_{pt}$ designates the partial dispersion ratio at the t-line, defined by $(n_C-n_t)/(n_F-n_C)$ with respect to said positive single lens element;

$\theta_{nt}$ designates the average of the partial dispersion ratios at the t-line, defined by $(n_C-n_t)/(n_F-n_C)$ with said negative single lens elements;

$n_C$ the refractive index at the C-line;

$n_t$ designates the refractive index at the t-line; and $n_F$ designates the refractive index at the F-line.

2. The achromatic lens system according to claim 1, wherein said achromatic lens system satisfies the following condition:

$|\theta_{pg}-\theta_{ng}|<0.02$ wherein:

$\theta_{pg}$ designates the partial dispersion ratio at the g-line, defined by $(n_g-n_F)/(n_F-n_C)$ with respect to said positive single lens element;

$\theta_{ng}$ designates the average of the partial dispersion ratios at the g-line, defined by $(n_g-n_F)/(n_F-n_C)$ with respect to said negative single lens elements; and ng designates the refractive index at the g-line.

3. The achromatic lens system according to claim 1, wherein said positive single lens element is made of an optical glass material.

4. The achromatic lens system according to claim 1, wherein said positive single lens element satisfies the following condition:

$\nu_P>80.0$ wherein $\nu_P$ designates the Abbe number of said positive single lens element.

5. The achromatic lens system according to claim 4, wherein said positive single lens element satisfies the following condition:

$\nu_P>91.0$.

* * * * *